No. 702,934. Patented June 24, 1902.
F. A. ERRINGTON.
STUD SETTING MACHINERY.
(Application filed Jan. 23, 1901.)
(No Model.)
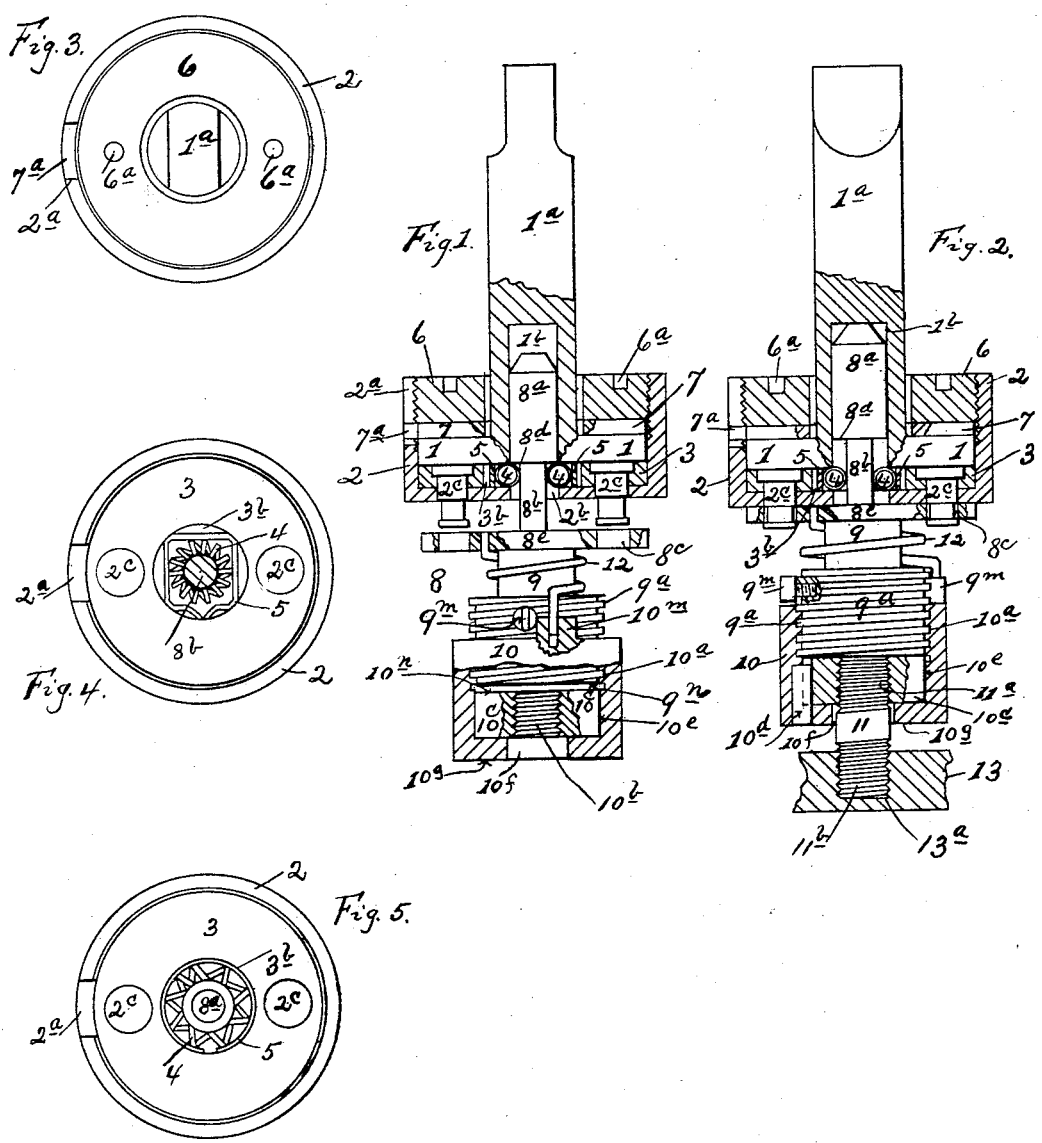
WITNESSES:
INVENTOR

UNITED STATES PATENT OFFICE.

FRANKLIN A. ERRINGTON, OF NEW YORK, N. Y.

STUD-SETTING MACHINERY.

SPECIFICATION forming part of Letters Patent No. 702,934, dated June 24, 1902.

Application filed January 23, 1901. Serial No. 44,422. (No model.)

*To all whom it may concern:*

Be it known that I, FRANKLIN ALFRED ERRINGTON, a citizen of the United States of America, residing in New York city, borough of Richmond, State of New York, (post-office Stapleton,) have invented certain new and useful Improvements in Stud-Setting Machinery, of which the following is a specification.

My invention relates, broadly, to means for connecting and disconnecting shafts while rotating, and more particularly to means for elastically centering a retaining-spring to prevent its exposure to breakage, to means for automatically tightening and releasing a stud in a stud-holder, and to other details of improvements and combinations of parts hereinafter described, and then pointed out in the claims.

Reference is to be had to the accompanying drawings, forming part hereof, wherein—

Figure 1 is a vertical cross-section of a device embodying my invention, the parts being shown with the stud-setter in the idle position, except that the spring and its connections are illustrated in the stud-releasing position, the spring being under tension and the threaded parts slack. Fig. 2 is a similar view of the parts, illustrating the stud-setter in the driving position, the spring being relaxed and the threaded parts under tension. Fig. 3 is a top plan view of Fig. 1. Fig. 4 is a similar view of the friction-driven disk, the driving-spindle, check-washer, and adjusting-nut being removed to show the retaining-spring surrounded by its centering-spring within the rigid walls of the spring-recess, the parts being illustrated in their normal positions, as seen in Fig. 1; and Fig. 5 is a similar view showing the retaining and centering springs expanded during the passage of the enlarged portion of the stud-holder shank through them.

Similar numerals of reference indicate corresponding parts in the several views.

$1^a$ is a shank of a driving friction-disk 1, provided with an axial socket $1^b$. An internally-screw-threaded cup-shaped friction-driven disk 2 surrounds the friction driving-disk $1^a$ and is shown slotted on one side at $2^a$ and provided at its bottom with clutches, preferably shown in the form of clutch-pins $2^c$, the projecting portions of which are preferably shown undercut. An axial bore $2^b$ registers with socket $1^b$. A fiber friction-washer 3 is preferably interposed between the disks 1 and 2 and provided with an axial bore $3^b$ (shown of greater diameter than the socket $1^b 2^b$) to form a concentrically-located spring-recess $3^b$ in the side walls of socket $1^b 2^b$ to receive an expansible annular retaining-spring 4, preferably shown as a spiral spring having its ends joined together, said spring 4 being surrounded by a flat rectangular-shaped centering-spring 5, Fig. 4. An externally-screw-threaded adjusting-nut 6 surrounds the shank $1^a$ and meshes with the internal screw-threads of friction-driven disk 2, and between disk 1 and nut 6 I interpose a fiber check-washer 7, having a lug $7^a$, that meshes with the slot $2^a$.

A stud-setter 8 is provided with a shank $8^a$, having a reduced slideway $8^b$ and a shoulder $8^d$ at the junction of said reduced slideway and the upper enlarged portion of shank $8^a$. A disk $8^e$ of the stud-setter is shown pierced by clutch-holes $8^c$, adapted to receive clutch-pins $2^c$. A shaft 9 is shown projecting from disk $8^e$ and having screw-threads $9^a$ at its lower portion to mesh with corresponding screw-threads $10^a$ at one end of a stud-holder 10. The other end of the stud-holder is provided with screw-threads $10^b$ of a finer pitch than $10^a$ to mesh with those $11^a$ of a stud 11. The screw-threads $10^b$ are preferably shown carried by a removable stud-nut $10^c$, which is connected to rotate with stud-holder 10 by a pin $10^d$, projecting from the side wall of recess $10^e$ into a suitable slot in the periphery of stud-nut $10^c$. An opening $10^f$ in the bottom plate $10^g$ of stud-holder 10 admits the stud 11 to mesh with screw-threads $10^b$. A lug $10^m$ projects from stud-holder 10 to engage a projection or projections $9^m$, carried by shaft 9, to limit the movement of holder 10 upon shaft 9. A spiral spring 12 is preferably employed to actuate the screw-threaded parts 9 and 10 to bring the inner face $10^n$ of the stud-nut against the outer end face $9^n$ of shaft 9 upon the removal of one stud 11 to make ready for the setting of the next stud; but the operator may grasp the holder 10 by hand and screw it upon shaft 9, if desired, and thereby omit spring 12 and its automatic function. The construction of the parts may be varied without departing from the spirit of my invention.

The operation of the parts is as follows: The friction-driven disk 2 is clamped with more or less pressure to the friction-driven disk 1, according to the size of the stud to be set, by turning nut 6, say, by a suitable wrench applied at holes $6^a$. The slip-joint connection of lug $7^a$ with slot $2^a$ prevents the slipping of disk 1 from altering the position of the adjusting members 6 2 relatively with each other. The upper end of the shank $8^a$ is preferably tapered to expand the annular retaining-spring 4 and its centering-spring 5 to pass the enlarged portion of the shank $8^a$, (see Fig. 5,) and said springs will contract under shoulder $8^d$, Figs. 2, 4, before the clutch-pins $2^c$ engage clutch-openings $8^c$ to enable the stud-setter 8 to be supported and loosely centered with shank $1^a$ and socket $1^b$ by annular spring 4, yet not be rotatively connected with disk 2, so that all danger of turning in the operator's hand is obviated. Practice has shown that spiral spring 4 is liable to breakage by the entrance of shank $8^a$, and I have invented elastic walls 5, arranged in angular form and adapted to connect the annular retaining-spring 4 with the rigid side walls of the spring-recess $3^b$ in such a manner as to retain the spring 4 in a position concentric with the socket $2^b$. I preferably form the elastic angular walls 5 by using a flat spring or springs 5, and for purposes of illustration I have shown a style of spring that can be made in one piece, the unjoined ends being shown projecting outwardly in V shape to secure a bearing of that side of the elastic angular form upon the rigid side walls of the spring-recess $3^b$, for the reason that it is desirable to use a form of centering-spring 5 that can be readily inserted and removed from recess $3^b$ through the opening $2^b$ without taking the device apart; but it is obvious that the centering-spring 5 can be formed in other ways than that shown that will be able to perform the function of the single centering-spring 5 and still come within the spirit of my invention. By the combination of a retaining and centering springs 4 5 all lateral pressure of a retaining-spring as previously known upon a shaft $8^a$ is avoided, the rectangular centering-spring 5 to guard against this breakage by keeping the annular spring 4 concentric with the opening $2^b$. To enable centering-spring 5 to be readily inserted and removed from recess $3^b$ through opening $2^b$, I have avoided connecting the ends of said centering-spring together, but have preferably projected them outward in V shape to practically secure the same effect as if the ends were joined together and the centering-spring 5 was a complete rectangle. I thus secure a rectangular readily-removable centering-spring 5, that forms an elastic connection between the rigid walls of the recess $3^b$ and the expansible retaining-spring 4, whereby said retaining-spring 4 is elastically centered with the socket $1^b$ $2^b$. All the lateral pressure of previously-known retaining-springs is thus eradicated. Upon the end $11^b$ of stud 11 being pressed against work 13 the shank $8^a$ rises in socket $1^b$ and the driving-clutches $2^c$ $8^c$ automatically slip into engagement to rotate the stud-setter 8 to the right hand, (in the construction shown,) whereupon the end $11^a$ of the stud 11 will screw up into nut $10^c$ until said end $11^a$ will press against the outer end $9^n$ of shaft 9, which pressure slacks the tension on threads $9^a$ $10^a$ and yet maintains the friction of the threads $11^a$ $10^b$ at the maximum to screw stud 11 into the hole $13^a$ of the work. When the stud 11 is set fast in the hole $13^a$, the shank $1^a$ and all its connections are thereupon rotated in the opposite direction, which unscrews the shaft 9 from stud-holder 10 and compresses spring 12 until the lugs $9^m$ $10^m$ arrest the further unscrewing of the stud-holder. This relative movement of the parts 9 10 automatically relieves the pressure of the end of the stud 11 from the end of the shaft 9, so that the stud 11 is unscrewed from the stud-nut $10^c$ without any back pressure on the stud 11 of sufficient amount to endanger loosening it in the hole $13^a$. As soon as the friction of the threads of stud 11 and stud-nut $10^c$ cease to hold the lugs $9^m$ $10^m$ in engagement the spring 12 automatically screws up the stud-holder 10 upon the shaft 9 to bring the face $10^n$ against the face $9^n$ ready for the inserting of the next stud. A slight push ahead by the operator's hand in the direction of rotation will disengage the clutches $2^c$ from the clutch-openings $8^c$ without stopping the rotation of shank $1^a$, whereupon the stud-setter 8 will drop down in the socket $1^b$ $2^b$ until the retaining-spring 4 engages the shoulder $8^d$, whereupon the stud-setter 8 will resume the position shown in Fig. 1, where it can be grasped and withdrawn from socket $1^b$ without danger of turning in the operator's hand, although the shank $1^a$ continues to rotate.

Having now described my invention, what I claim is—

1. A part having a socket the side walls of which are indented by a concentric spring-recess having rigid side walls, an expansible annular spring located in said spring-recess, and a centering spring or springs interposed between said annular spring and said rigid side walls of said recess and adapted to elastically center said annular spring with said socket, substantially as described.

2. A part having a socket the side walls of which are indented by a concentric spring-recess having rigid side walls, an expansible annular spring located in said spring-recess, a centering spring or springs interposed between said annular spring and said rigid side walls of the recess, and a shaft adapted to expand said annular spring and be elastically centered thereby with said socket, substantially as described.

3. A part having a socket the side walls of which are indented by a concentric spring-recess having rigid side walls, an expansible annular spring located in said spring-recess, a centering spring or springs interposed between said annular spring and said rigid side walls of said recess, a shaft adapted to expand said annular spring and having a shoulder to coact with said annular spring to support said shaft in said socket, substantially as described.

4. A part having a socket the side walls of which are indented by a concentric spring-recess having rigid side walls, an expansible annular spring located in said spring-recess, and a centering spring or springs arranged in angular form and interposed between said annular spring and said rigid side walls of said recess, the central inner surfaces of the centering spring or springs being adapted to engage the periphery of the annular spring and the corners of the angular form being adapted to engage said rigid side walls of said spring-recess, substantially as described.

5. A part having a socket the side walls of which are indented by a concentric spring-recess having rigid side walls, an expansible annular spring located in said spring-recess, and a centering spring or springs arranged in angular form and interposed between said annular spring and said rigid walls of said recess, the ends of the centering spring or springs being unattached to facilitate the insertion and removal thereof from said recess, substantialy as described.

6. A part having a socket the side walls of which are indented by a concentric spring-recess having rigid side walls, an expansible annular spring located in said spring-recess, and a centering spring or springs arranged in angular form and interposed between said annular spring and said rigid walls of said recess, the ends of the centering-spring being bent outward to hold said angular form in position to elastically center the annular spring, substantially as described.

7. A part having a socket the side walls of which are indented by a concentric spring-recess having rigid side walls, an expansible annular spring located in said recess, a centering spring or springs interposed between the annular spring and the rigid walls of the recess to form an elastic connection between said rigid walls and said annular spring, a shaft, rotary driving-clutches carried by said socketed part and by said shaft, said shaft having a shoulder so located along its periphery as to permit said annular spring to grip under said shoulder before said clutches become engaged, substantially as described.

8. A screw-threaded shaft, a stud-holder provided at one end with screw-threads to mesh with those of a stud and at the other end with screw-threads of a coarser pitch to mesh with the correspondingly-coarse screw-threads of the shaft, substantially as described.

9. A screw-threaded shaft, a stud-holder provided at one end with screw-threads to mesh with those of a stud and at the other end with screw-threads to mesh with those of the shaft, said shaft and said stud-holder having suitable projections to engage each other to limit the independent rotation of said parts, substantially as described.

10. A screw-threaded shaft, a stud-holder provided at one end with screw-threads to mesh with those of a stud and at the other end with screw-threads to mesh with those of the shaft, and a spring to rotate said stud-holder upon said shaft to screw said shaft into said holder automatically after said screw-threaded parts have been partly unscrewed from each other, substantially as described.

11. A screw-threaded shaft, a stud-holder provided with screw-threads that mesh with those of said shaft, a removable stud-nut connected to rotate with said stud-holder, said stud-nut being internally screw-threaded to mesh with the threads of a stud, substantially as described.

12. A screw-threaded shaft, a stud-holder provided at one end with a removable stud-nut having internal screw-threads of a finer pitch than those on said shaft and at the other end with screw-threads of a correspondingly-coarse pitch with those of said shaft, substantially as described.

F. A. ERRINGTON.

Witnesses:
F. A. CLEMONS,
D. J. WILSON.